May 20, 1958
F. E. WILLIAMS
2,835,822
X-RAY FLUOROSCOPIC SCREEN
Filed Sept. 12, 1955
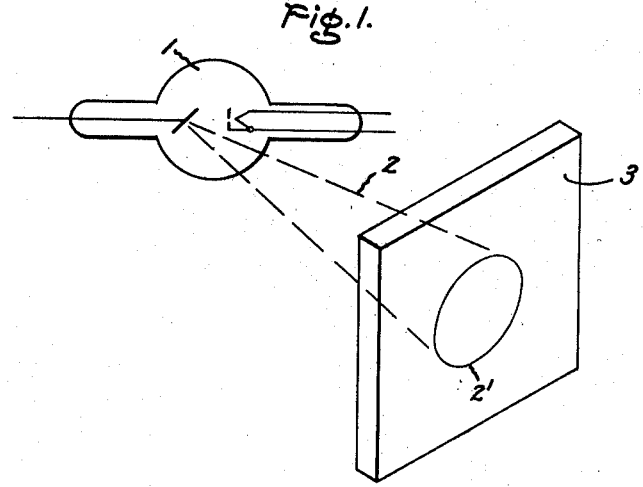
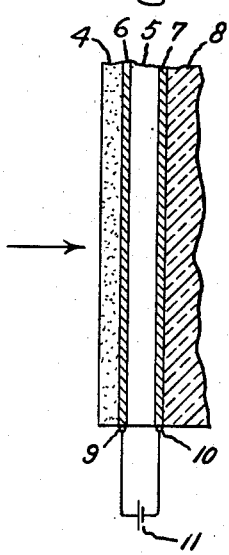
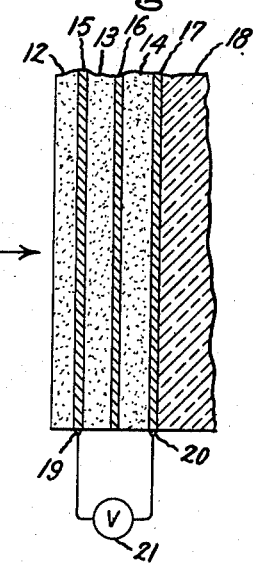
Inventor:
Ferd E. Williams,
by Paul A. Frank
His Attorney.

United States Patent Office 2,835,822
Patented May 20, 1958

2,835,822
X-RAY FLUOROSCOPIC SCREEN
Ferd E. Williams, Scotia, N. Y., assignor to General Electric Company, a corporation of New York
Application September 12, 1955, Serial No. 533,544
9 Claims. (Cl. 250—80)

The present invention relates to X-ray fluoroscopic screens. More particularly, the invention relates to X-ray fluoroscopic screens which have the property of presenting amplified visual images when excited by X-rays.

In my copending application Serial No. 451,583, now abandoned, and the copending application of D. A. Cusano, Serial No. 451,355, now abandoned, both filed August 23, 1954, and assigned to the same assignee as the present invention, there are described and claimed X-ray image intensification screens and systems. The present invention represents certain improvements and modifications of the screens and systems of the aforementioned applications particularly adapted to the field of X-ray fluoroscopy.

Because X-ray fluoroscopic images are viewed by the human eye, rather than a photographic plate, as are X-ray fluorographic screens, the need for amplification of the brightness of X-ray fluoroscopic screens is particularly great. This need arises, in part, from deficiencies of the human eye as compared to a photographic plate. Some such deficiencies are a much smaller viewing angle and low dark adaptation of the human eye.

In the past, many attempts have been made to meet the need for intensified X-ray fluoroscopic images. Such attempts have generally relied upon electronic amplification systems to secure image intensification. Such electronic systems are, however, cumbersome, difficult to operate, and expensive.

Accordingly, one object of the present invention is to provide a means for producing intensified X-ray fluoroscopic images which is easy to operate and inexpensive.

A further object of the invention is to provide a solid state X-ray fluoroscopic image intensification system.

Another object of the invention is to provide an X-ray fluoroscopic image intensifier which produces true amplification.

Briefly stated, in accord with one embodiment of my invention, I provide a composite X-ray fluoroscopic screen which includes a layer of X-ray sensitive and visible light emitting material and a layer of visible light amplifying material together with means for impressing an electrical potential difference across the light amplifying material. The two layers are chosen so that the peak visible light emission from the X-ray sensitive layer substantially corresponds to the peak spectral sensitivity of the second, light amplifying layer. X-rays incident upon the X-ray sensitive layer cause the emission of short wavelength visible light therefrom. The short wavelength visible light is directed upon the light amplifying phosphor layer which is particularly sensitive to this wavelength and causes the creation of energized electrons which are multiplied within the phosphor layer by an electron avalanche phenomenon due to the electric field impressed thereupon. Electrons resulting from the electron avalanche in turn excite centers of luminescence within the light amplifying phosphor layer. Because of the multiplication of excited electrons within the light amplifying phosphor due to the presence of the electric field impressed thereupon, the total radiant energy content of visible light emitted from the composite fluoroscopic screen is greatly in excess of the radiant energy content of the X-radiation falling thereupon. Thus, true radiation amplification is obtained.

In accord with another feature of the present invention I provide an image intensifying X-ray fluoroscopic screen which includes a layer of X-ray sensitive, visible light emitting material which emits short wavelength light when excited by X-rays, and an image intensifying cell which is sensitive to substantially the same short wavelength visible light as emitted by the X-ray sensitive layer. The image intensifying cell of this feature of the invention includes a photoconducting layer in series with an electroluminescent layer, both of which are subjected to a unidirectional or alternating electric field.

The features of my invention which are believed to be novel are set forth with particularity in the appended claims. The invention itself, however, together with further objects and advantages thereof may best be understood by reference to the following description taken in conjunction with the attached drawing, in which:

Fig. 1 is a perspective view of one embodiment of the invention;

Fig. 2 is a vertical cross-section of the device of Fig. 1; and

Fig. 3 is a vertical cross-sectional view of an X-ray fluoroscopic screen illustrating a further embodiment of the invention.

In Fig. 1 a source of X-rays as, for example X-ray tube 1, is disposed so as to cause X-rays 2 to fall upon light amplifying fluoroscopic screen 3 causing an image 2' to appear thereon. The structure of light amplifying X-ray fluoroscopic screen 3 is shown in detail in Fig. 2 which is a vertical cross-sectional view of screen 3. In Fig. 2 fluoroscopic screen 3 comprises a layer of X-ray sensitive and visible light emitting material 4 and a layer of visible light sensitive and visible light emitting material 5, layer 5 being spaced between transparent conducting layers 6 and 7 and contiguous therewith. The multilayer structure is mounted upon a transparent base plate 8. Electrical contact is provided to transparent conducting layers 6 and 7 by means of contact terminals 9 and 10 respectively. A unidirectional electrical potential is applied between contacts 9 and 10 by a direct current voltage source represented generally as battery 11.

X-ray sensitive and visible light emitting material 4 may comprise any of the materials presently known to possess this property and employed in X-ray screens both fluoroscopic and fluorographic. Some such materials are described in Patent No. 2,129,296, Wurstlin, which discloses calcium tungstate ($CaWO_4$) and Patent No. Re. 21,216, Eggert et al., which discloses various zinc sulphides (ZnS). It is to be understood that, although these materials are set forth by way of example, for use in my image intensifying X-ray fluoroscopic screen, any well known X-ray sensitive and visible light emitting phosphor such as cadmium sulfide or zinc-cadmium sulfide may be used in this respect. It is particularly within the contemplation of this invention that X-ray sensitive and visible light emitting layer 4 comprise a mixed sulfide of zinc and cadmium and have an output wavelength spectrum which is within the range of maximum sensitivity of visible light sensitive and visible light emitting phosphor layer 5.

Visible light sensitive, visible light emitting phosphor layer 5 is a homogeneous, crystalline, continuous, nonparticulate phosphor layer having no electrical discontinuities therein. By continuous, as used herein, it is meant that layer 5 is composed entirely of phosphor from surface to opposite surface and exhibits no electrical resistivity discontinuities therein. This condition is necessary in order that multiplication of excited electrons therein occur by electron avalanche phenomena, as is described hereinafter. It is evident from the foregoing that conventional powdered suspensions of phosphor crystals in a dielectric binder do not satisfy the above condition and will not produce the radiant energy amplification attained in this embodiment of the invention. For a more exhaustive discussion of the homogeneity and electrically continuous characteristics of layer 5 and the necessity of these characteristics in this embodiment of my invention, reference is hereby made to my copending application, Serial No. 533,833 filed concurrently herewith and assigned to the same assignee as the present invention.

Visible light emitting phosphor 5 is made sensitive to short wavelength visible light in the blue region of the visible spectrum, preferably from 4000 to 5500 Angstrom units. I have found that visible light sensitive, light amplifying phosphor 5 may be made sensitive to this wavelength visible light excitation by one or more of the following means. Phosphor film 5 may comprise a mixture of zinc and cadmium sulfides with the zinc comprising from 0% to 70% by weight of the total sulfide. This mixed sulfide may be activated with from 0.5 to 2% by weight of manganese and 0.001 to 0.3% by weight of chlorine. Alternatively, light amplifying phosphor 5 may comprise a zinc sulfoselenide, in which the zinc sulfide comprises from 0 to 70% by weight of the total zinc salt, the remainder being zinc selenide. This mixed salt may be activated with from 0.5 to 2% by weight of manganese and from 0.001 to 0.3% by weight of chlorine. Phosphor film 5 may also be made sensitive to short wavelength visible light if the salt comprises essentially zinc sulfide activated with from 0.5 to 2% by weight of manganese and from 0.001 to 0.3% by weight of iodine, gallium or indium. It is to be understood that light amplifying phosphor film 5 may be prepared in accord with any combination of the above three mentioned means for rendering the film sensitive to short wavelength visible light. Thus, for example, the phosphor may comprise any chemical having the formula

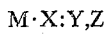

$$M \cdot X : Y, Z$$

where M is from 0 to 70% by weight of zinc, the remainder being cadmium, X is from 0 to 70% by weight of sulfur, the remainder being selenium, Y is from 0.5 to 2% by weight manganese, Z is from 0.001 to 0.3% by weight of chlorine, indium, gallium, or iodine.

Transparent conducting electrodes 6 and 7 may conveniently be thin films, of approximately 0.1 to 1 micron thickness, of titanium dioxide, which are produced by the reaction of vapors of titanium tetrachloride and water vapor at an elevated temperature of approximately 150 to 200° C. As deposited, these films have an initially high resistivity, but subsequent heat treatment in the presence of a zinc compound or in a reducing atmosphere renders the films sufficiently conductive to serve as a transparent conducting electrode in the device of the present invention. The method of forming such transparent conducting films is disclosed and claimed in the copending application of Cusano and Studer, Serial No. 243,271, filed August 23, 1951.

Image intensifying X-ray fluoroscopic screen 3 may be prepared as follows. A transparent refractory base plate 8 of a material which will withstand temperatures of approximately 500° to 600° C., such as for example, glass or quartz, is mounted within a reaction chamber and heated to a temperature of approximately 200° C. In accord with the method of the aforementioned Cusano and Studer application, Serial No. 243,271, vapors containing titanium tetrachloride and water vapor are brought into contact in the vicinity of plate 8, resulting in the deposition upon the surface thereof of a thin layer of titanium dioxide 7. Plate 8 having thereon film 7 of titanium dioxide is then removed and placed in a second reaction chamber and coated with a thin transparent film of zinc sulfide activated with manganese and iodine according to the method described and claimed in U. S. Patent No. 2,685,530 to Cusano and Studer. This is accomplished by bringing a charge containing zinc, zinc iodide and manganese iodide into a crucible heated to a temperature of approximately 750° C. whereby the constituents of the charge are vaporized. At the same time a reducing gas which may be hydrogen sulfide, hydrogen selenide, or a mixture of hydrogen sulfide and hydrogen selenide is allowed to enter the chamber so that the gas and the vapors of the constituents of the charge react in the vicinity of glass plate 8, resulting in the chemical deposition of a transparent luminescent film which is essentially zinc sulfoselenide activated with iodine. It is to be understood that the percentage and constituents of the charge material may be varied so that the vapor deposited film comprises a mixed salt of zinc and cadmium sulfides or selenides as well. Additionally, the iodine may be replaced by indium or gallium.

Glass base plate 8, having thereon transparent conducting film 7 and transparent phosphor film 5, is then returned to the first reaction chamber and the process for the deposition of a transparent conducting film is repeated, introducing titanium tetrachloride and water vapor into the chamber while the plate is maintained at a temperature of approximately 200° C. As deposited, transparent film 6 is not highly conductive but it may be rendered so by flushing the reaction chamber with hydrogen or hydrogen sulfide, or any other suitable reducing gas for a period of approximately ½ to 1 hour while maintaining base plate at high temperature, thus rendering the titanium dioxide sufficiently conductive to serve as an electrode in the device of the invention.

Glass base plate 8 having thereon transparent conducting film 7, phosphor film 5, and transparent conducting film 6, is then removed from the reaction chamber and a layer of X-ray sensitive and visible light emitting material 4, comprising preferably a mixed crystalline powder of zinc and cadmium sulfides in which the cadmium comprises from 15% to 35% by weight of the sulfide, is sprayed upon conducting transparent film 6 in a nitrocellulose or potassium silicate binder, a technique conventionally used and well known in the art of applying phosphors to base plates. The entire base plate assembly is then baked for approximately 1 hour at a temperature of approximately 400° C. to thermally set the potassium silicate binder, or at approximately 200° C. to thermally set the nitrocellulose binder.

When the binder has set terminals 9 and 10 are connected to transparent conducting films 6 and 7 respectively by silver paste or other means well known to the art and a unidirectional electrical potential is applied between terminals 9 and 10 so as to impress a unidirectional electric field of from $10^4$ to $10^7$ volts per centimeter upon light amplifying phosphor film 5.

In operation X-rays impinge upon X-ray sensitive and light emitting layer 4 causing the emission of short wavelength or blue light, preferably from 4000 to 5500 Angstroms wavelength, of low intensity in accord with the pattern contained within the X-rays. This light passes through transparent conducting electrode 6 and is impressed upon light amplifying phosphor film 5 which is chosen to have a peak sensitivity substantially corresponding to the peak light emission from layer 4. In light amplifying layer 5, due to the applied unidirectional electric field impressed thereon, each photon of incident energy is multiplied by electron avalanche phenomena to cause the creation of a number of excited electrons which in turn excite the centers of excitation contained therein due to the presence of manganese and iodine causing the production of an enhanced amplified image of the X-ray pattern pressed upon layer 4.

One specific example of the device of Fig. 2 comprises a glass base plate 8, a transparent conducting film 7 of titanium dioxide, approximately 0.1 micron thick, a zinc-cadmim sulfide light amplifying phosphor film in the portions 75% zinc to 25% cadmium activated with 1% by weight of manganese and 0.1% by weight of iodine, the entire film being 10 microns thick, a transparent conducting film 6 of titanium dioxide, 0.3 micron thick, and a powder suspension of a polycrystalline mixture of zinc-sulfide activated with 0.1% by weight of silver in a nitrocellulose binder. The thickness of polycrystalline suspended X-ray sensitive layer 4 is approximately 75 microns and responds to soft X-rays of approximately 1 to 100 Angstrom units giving off a soft blue luminescence of approximately 4700 Angstrom units to which light amplifying phosphor film 5 responds with the emission of pale yellow light of approximately 5800 Angstrom units and of high brightness. The above described operation is obtained at an operating potential of 100 volts.

The broad concept of my invention wherein an X-ray fluoroscopic image intensifying screen may be produced comprising a layer of X-ray sensitive, visible light emitting material and a visible light sensitive, visible light emitting amplification cell may be embodied in another feature of my invention. In this feature of the invention, the light amplifying cell, rather than being composed of a single homogeneous phosphor layer, is composed of a composite cell comprising a photoconducting material and a layer of an electroluminescent phosphor. A device illustrative of this embodiment of my invention is illustrated in Fig. 3 of the drawing, which is a vertical cross-section of an image intensifying X-ray fluoroscopic screen as constructed in accord with this embodiment of the invention.

In Fig. 3, the fluoroscopic screen comprises an X-ray sensitive, visible light emitting layer 12 and an image intensifying cell composed of photoconducting layer 13, and electroluminescent layer 14 separated by light opaque layer 16 and enclosed within the transparent conducting electrodes 15 and 17. A unidirectional or alternating electrical potential is applied to electrodes 15 and 17 by means of terminal connections 19 and 20 respectively by a unidirectional or alternating voltage source represented generally as voltage source 21. The entire X-ray fluoroscopic screen is mounted upon a supporting base plate 18.

In accord with my invention, photoconducting layer 13 is chosen to have an excitation sensitivity which is substantially matched in wavelength by the peak emission of an associated X-ray sensitive visible light emitting material of layer 12. Thus, rather than relying upon the direct X-ray induced photoconductivity, two separate films are utilized, each to give its maximum efficiency resulting in a greater sensitivity to X-radiation and a greater amplification of the X-ray image.

As in the device illustrated in Fig. 2 of the drawing, the X-ray sensitive, visible light emitting layer 12 of the device of Fig. 3 may be any of the well-known X-ray sensitive, visible light emitting materials presently utilized in X-ray work, as for example calcium tungstate, zinc sulfide, cadmium sulfide, and mixtures thereof. The material comprising layer 12 is chosen, however, so that the emission peak coincides with the peak wavelength sensitivity of photoconducting layer 13. Preferably, layer 12 comprises a mixed crystalline suspension of zinc-cadmium sulfide in a plastic binder, such as nitrocellulose, the ratio of zinc to cadmium being approximately 3 to 1. The crystals are activated with approximately 0.001 to 0.3% by weight of silver. The spectral emission peak of this material is approximately 5100 Angstrom units. Photosensitive layer 13 of Fig. 3 may be any one of a number of well-known photoconducting semiconductive materials, as for instance, unactivated cadmium sulfide or zinc sulfide. If the mixture utilized in the above description is used for layer 12, layer 13 should comprise substantially pure crystals of cadmium sulfide which have a photoconductive sensitivity peak at approximately 5100 Angstrom units.

Electroluminescent layer 14 may conveniently comprise polycrystals of zinc sulfide activated with from 0.1 to 1% by weight of manganese or zinc sulfide activated with from 0.03 to 1.0% by weight of copper and co-activated with 0.01 to 0.3% by weight of chlorine and may physically comprise small crystals suspended in a dielectric binder. It will be appreciated, however, that the invention is not directed to the use of these electroluminescent materials but may utilize any of the many well known electroluminescent phosphors. Transparent conducting electrodes 15 and 17 may conveniently comprise thin layers from 0.1 to 1 micron thick of titanium dioxide or tin oxide and may be prepared in accord with the aforementioned process for the production of thin transparent conducting films. Opaque non-conducting film 16 may conveniently comprise a semiconductive or non-metallic opaque layer as, for instance, a sputtered or evaporated layer of germanium or silicon or any other suitable, opaque poorly conducting material approximately 10 microns thick. Opaque layer 16 is not necessary for this embodiment of the invention but is utilized only in case there is any overlapping between the photoconductive sensitivity of photoconducting layer 13 and the emission spectrum of electroluminescent layer 14. The function of opaque film 16 is to prevent positive feedback from electroluminescent layer 14 to photoconducting layer 15 and may be dispensed with if the sensitivity of layer 13 and the emission spectrum of layer 14 do not overlap.

In operation a beam of X-rays, represented by an arrow, impinge upon X-ray sensitive, visible light emitting film 12. In response to the X-ray excitation, the material of film 12 emits short wavelength visible light having a peak emission corresponding with the photo conducting sensitivity of photoconducting layer 13. A unidirectional or alternating voltage is applied to conducting transparent films 15 and 17 impressing an electric field across photoconducting layer 13 and electroluminescent layer 14. Because the voltage is evenly distributed between photoconducting layer 13 and electroluminescent layer 14, the field strength within electroluminescent layer 14 is insufficient to cause electroluminescence. When, however, visible light is emitted from X-ray sensitive, visible light emitting material 12 in response to X-ray excitation, the visible light impinges upon photoconducting layer 13 causing a sharp decrease in the resistivity thereof and concentrating the electric field due to the potential between transparent conducting layers 15 and 17 across electroluminescent layer 14. The thickness of photoconducting layer 13 and electroluminescent layer 14 and the potential applied to transparent conducting electrodes 15 and 17 are so chosen that the localized decrease in resistivity due to excitation of photoconducting layer 13 by light emitted from X-ray sensitive, visible light emitting layer 12 causes the field distribution across electroluminescent layer 14 to exceed the threshold of electroluminescence. A visible image is then produced by electroluminescent layer 14 which is the exact replica, but many times intensified, of the image impressed upon X-ray sensitive, visible light emitting layer 12 by the impingement of X-rays thereupon.

As a specific example of the device illustrative of this embodiment of the invention, the X-ray intensifying screen of Fig. 3 may comprise a glass base plate 18, a transparent conducting electrode of titanium dioxide 0.1 micron thick, an electroluminescent layer 14 comprising zinc sulfide crystals activated with 0.5% copper and 0.1% chlorine by weight suspended in a nitrocellulose binder and having a thickness of 50 microns. Opaque layer 16 may comprise an evaporated germanium film 10 microns thick. Photoconducting layer 13 may comprise a polycrystalline suspension of cadmium sulfide in a nitrocellulose binder having a thickness of approximately 50 microns. Transparent conducting layer 15 may comprise a layer of titanium dioxide 0.1 micron thick, an X-ray sensitive, visible light emitting layer 12 approximately 75 microns thick may comprise a zinc cadmium sulfide with the ratio of zinc to cadmium approximately 3 to 1 activated with 0.1% by weight of silver and chlorine. Contact is made to transparent conducting layers 15 and 17 by means of a silver paste. The device is operative with an applied alternating or unidirectional potential of approximately 100 volts. Electroluminescent layer 14, photoconducting layer 13 and X-ray sensitive, visible light emitting layer 12, all of which comprise polycrystalline suspensions in a dielectric binder, may be prepared by spraying the powdered crystals in a dielectric binder, such as nitrocellulose, and baking at a temperature of 200° C. for 1 hour. Transparent conducting layers 15 and 16 may be prepared by spraying titanium tetrachloride vapor upon the base in a moist atmosphere and heating at approximately 200° C. in an atmosphere of hydrogen or hydrogen sulfide.

In accord with a further feature of the invention, the device of Fig. 3 may be prepared having photoconducting layer 13 and electroluminescent layer 14 applied by the vapor deposition techniques described and claimed in the aforementioned Cusano and Studer Patent No. 2,685,530.

Although I have described above certain specific embodiments of my invention, many modifications will occur to those skilled in the art. It is to be understood, therefore, that I intend by the appended claims to include all such modifications as fall within the true spirit and scope of my invention.

What I claim as new and desire to secure by Letters Patent of the United States is:

1. An image intensifying X-ray fluoroscopic screen comprising a layer of X-ray sensitive light emitting material having a characteristic emission when excited by incident X-rays, a visible light amplifying cell contiguous with said X-ray sensitive material, said light amplifying cell having a peak sensitivity to the characteristic emission of said X-ray sensitive material, and means for impressing an electrical potential difference between opposite surfaces of said light amplifying cell.

2. An image intensifying X-ray fluoroscopic screen comprising a layer of X-ray sensitive light emitting material which emits visible light within the range of 4000 to 5500 Angstrom units when excited by incident X-rays, a visible light amplifying cell contiguous with said X-ray sensitive material, said light amplifying cell having a peak sensitivity to substantially the same wavelength light as is emitted by said X-ray sensitive material, and means for impressing an electrical potential difference between opposite surfaces of said light amplifying cell.

3. An image intensifying X-ray fluoroscopic screen comprising a layer of X-ray sensitive and visible light emitting material having a characteristic emission when excited by incident X-rays, a layer of visible light sensitive, visible light emitting material having a peak sensitivity to the characteristic emission of said X-ray sensitive, visible light emitting material parallel with, and adapted to be excited by the emission of said X-ray sensitive layer, and means for applying an electrical potential difference between opposite surfaces of said visible light sensitive, visible light emitting layer.

4. An image intensifying X-ray fluoroscopic screen comprising a layer of X-ray sensitive and visible light emitting material having a characteristic emission when excited by incident X-rays, a continuous, homogeneous, non-particulate layer of visible light sensitive, visible light emitting material having a peak sensitivity to the characteristic emission of said X-ray sensitive, visible light emitting material parallel with and adapted to be excited by the emission of said X-ray sensitive layer, and means for applying an electrical potential difference between opposite surfaces of said visible light sensitive, visible light emitting layer.

5. An image intensifying X-ray fluoroscopic screen comprising a layer of X-ray sensitive and visible light emitting material having a characteristic emission when excited by X-rays, a first transparent conducting film contiguous with one surface of said X-ray sensitive layer, a continuous, homogeneous, non-particulate layer of visible light sensitive, visible light emitting material having a peak sensitivity to the characteristic emission of said X-ray sensitive, visible light emitting material contiguous with one surface of said first transparent conducting film, a second transparent conducting film contiguous with one surface of said visible light sensitive, visible light emitting material, a supporting base plate contiguous with one surface of said second transparent conducting film, and means for applying an electrical potential difference between said first and second transparent conducting films.

6. An image intensifying X-ray fluoroscopic screen comprising a layer of X-ray sensitive and visible light emitting material having a characteristic emission when excited by X-rays, a first transparent conducting film overlying said X-ray sensitive layer, a continuous homogeneous, non-particulate layer of visible light sensitive, visible light emitting material having a peak sensitivity to the characteristic emission of said X-ray sensitive visible light emitting layer overlying said first transparent conducting film, a second transparent conducting film overlying said visible light sensitive visible light emitting layer, a transparent base plate contacting said second transparent conducting film, and means for applying an electrical potential difference between said first and second transparent conducting films.

7. An image intensifying X-ray fluoroscopic screen comprising a layer of X-ray sensitive and visible light emitting material having a characteristic emission when excited by X-rays and comprising a material selected from the group consisting of calcium tungstate, zinc sulfide, cadmium sulfide and mixtures thereof, a first transparent conducting film overlying said X-ray sensitive layer, a continuous homogeneous non-particulate layer of visible light sensitive and visible light emitting material having a peak sensitivity to the characteristic emission of said X-ray sensitive material and having the composition M.X:Y,Z in which M is from 0 to 70 weight percent zinc, the remainder being cadmium, X is from 0 to 70 weight percent sulfur, the remainder being selenium, Y is 0.5 to 2 weight percent of manganese and Z is from 0.001 to 0.3 weight percent of a material selected from the group consisting of chlorine, iodine, gallium and indium overlying said first transparent conducting film, a second transparent conducting film overlying said visible light sensitive, visible light emitting layer, a transparent supporting base plate contacting said second transparent conducting film, and means for applying an electrical potential difference between said first and second transparent conducting films.

8. An image intensifying X-ray fluoroscopic screen comprising a layer of X-ray sensitive and visible light emitting material having a characteristic emission when excited by X-rays, a first transparent conducting film overlying said X-ray sensitive layer, a layer of a photoconductive material having a peak photoconductive sensitivity to the characteristic emission of said X-ray sensitive layer overlying said first transparent conducting film, a layer of opaque non-conducting material overlying said photoconductive material, a layer of electroluminescent phosphor overlying said opaque layer, a second transparent conducting layer overlying said electroluminescent layer, a transparent supporting base plate contacting said second transparent conducting film, and means for impressing an electrical potential difference between said first and second transparent conducting films.

9. An image intensifying X-ray fluoroscopic screen comprising a layer of X-ray sensitive and visible light emitting material having a characteristic emission when excited by X-rays and comprising a material selected from the group consisting of calcium tungstate, zinc sulfide, calcium sulfide and mixtures thereof, a first transparent conducting film overlying said X-ray sensitive material, a layer of a photoconductive material having a peak photoconductive sensitivity to the characteristic emission of said photoconductive layer and selected from the group consisting of zinc sulfide and cadmium sulfide and mixtures thereof overlying said first transparent conductive film, a layer of opaque non-conductive material overlying said photoconductive layer, a layer of an electroluminescent phosphor comprising zinc sulfide activated with 0.03 to 1.0 weight percent copper and 0.01 to 0.3 weight percent chlorine overlying said opaque non-conductive layer, a second transparent conductive film overlying said electroluminescent layer, a transparent supporting base plate contacting said second transparent conducting film, and means for applying an electrical potential difference between said first and second transparent conducting films.

References Cited in the file of this patent

UNITED STATES PATENTS

| | | |
|---|---|---|
| 2,650,310 | White | Aug. 25, 1953 |
| 2,743,195 | Longini | Apr. 24, 1956 |

Notice of Adverse Decision in Interference

In Interference No. 90,476 involving Patent No. 2,835,822, F. E. Williams, X-ray fluoroscopic screen, final decision adverse to the patentee was rendered July 16, 1963, as to claims 1, 2 and 8.

[*Official Gazette September 3, 1963.*]